United States Patent Office 3,387,809
Patented June 11, 1968

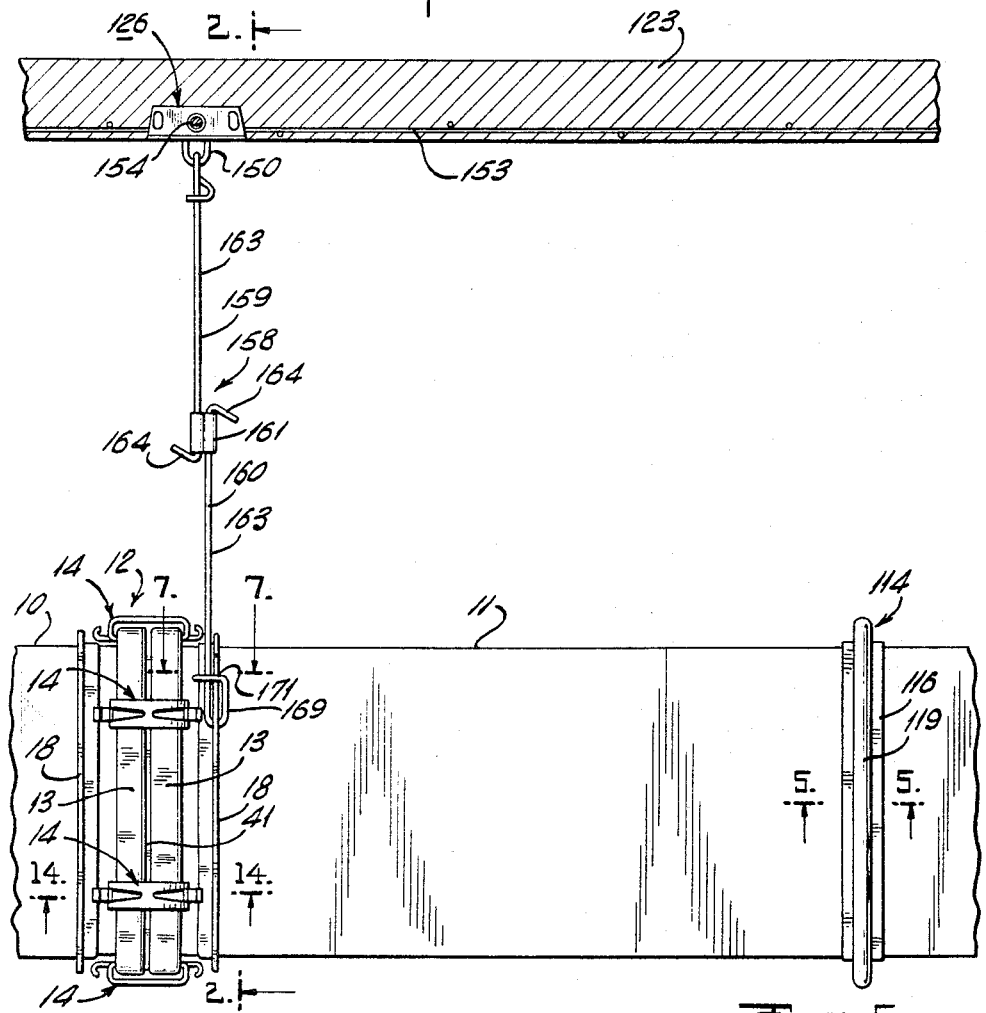

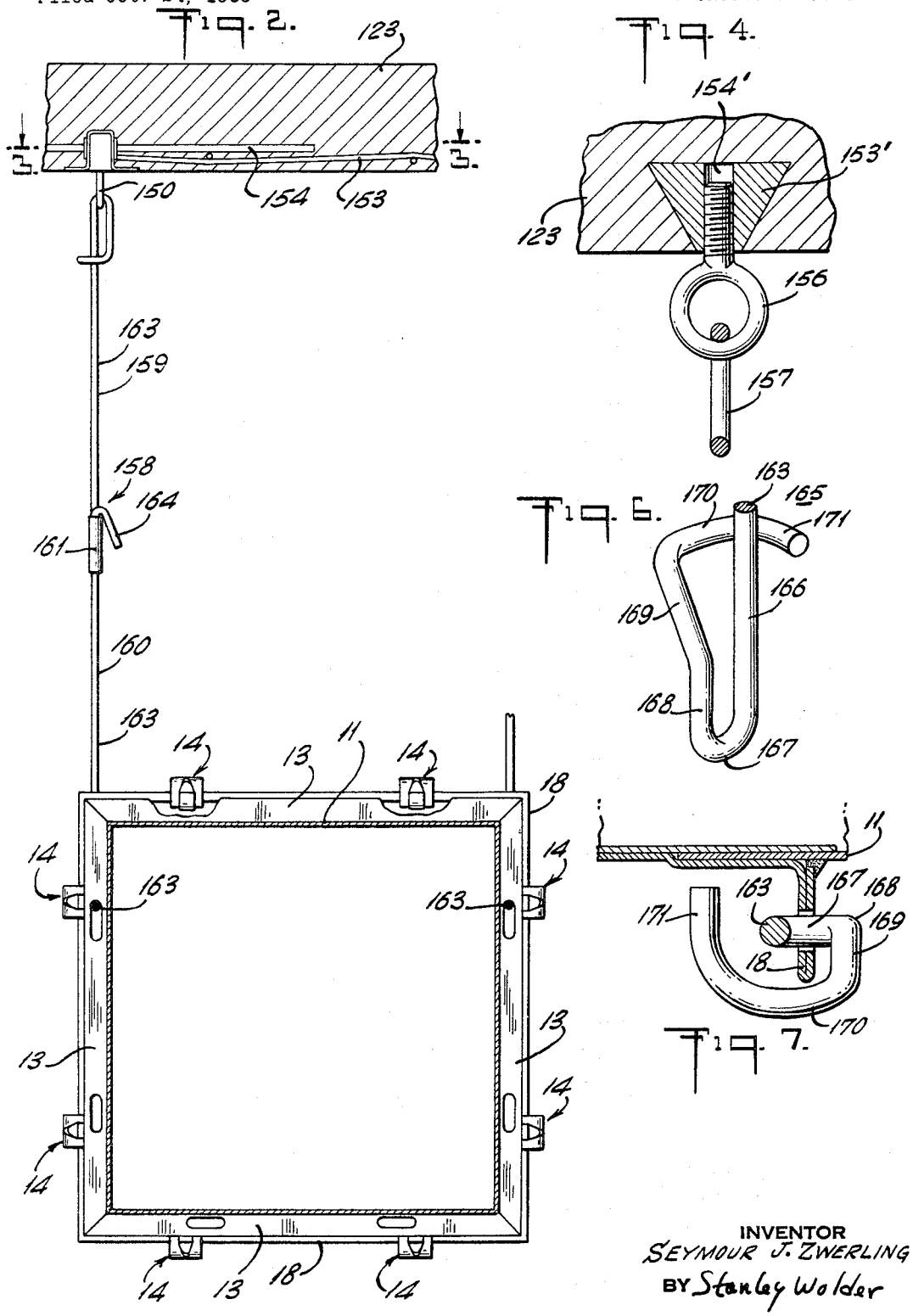

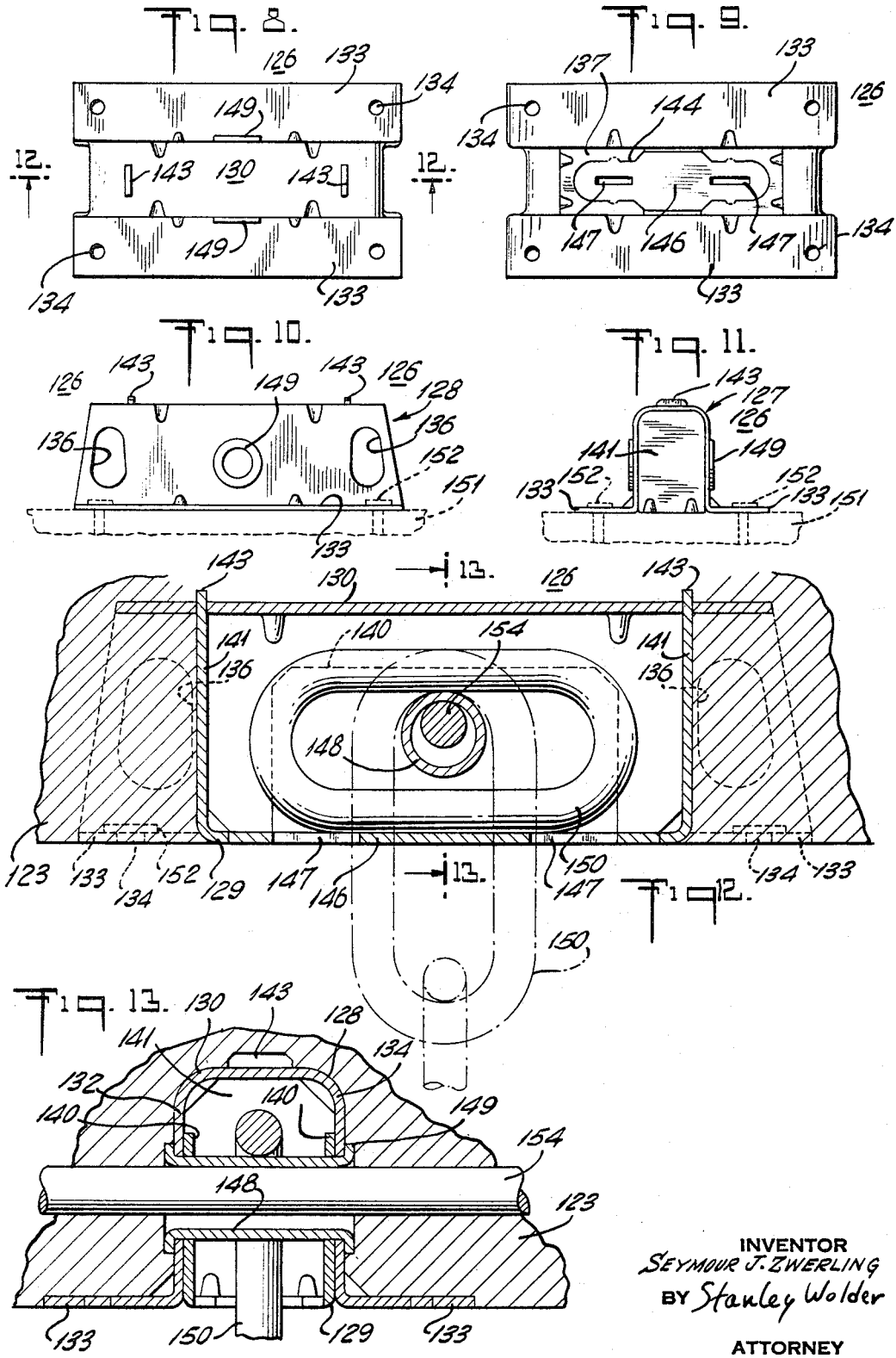

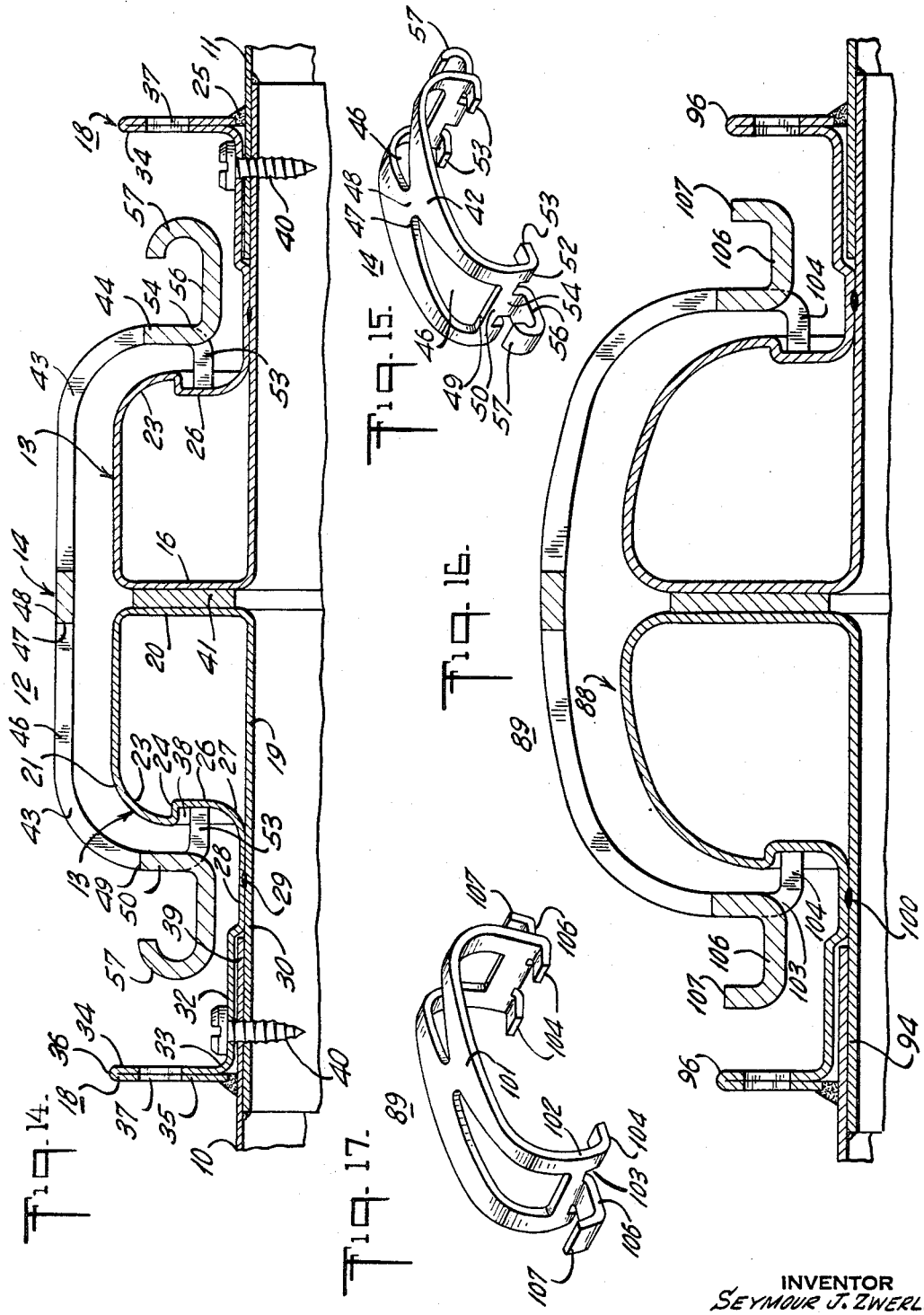

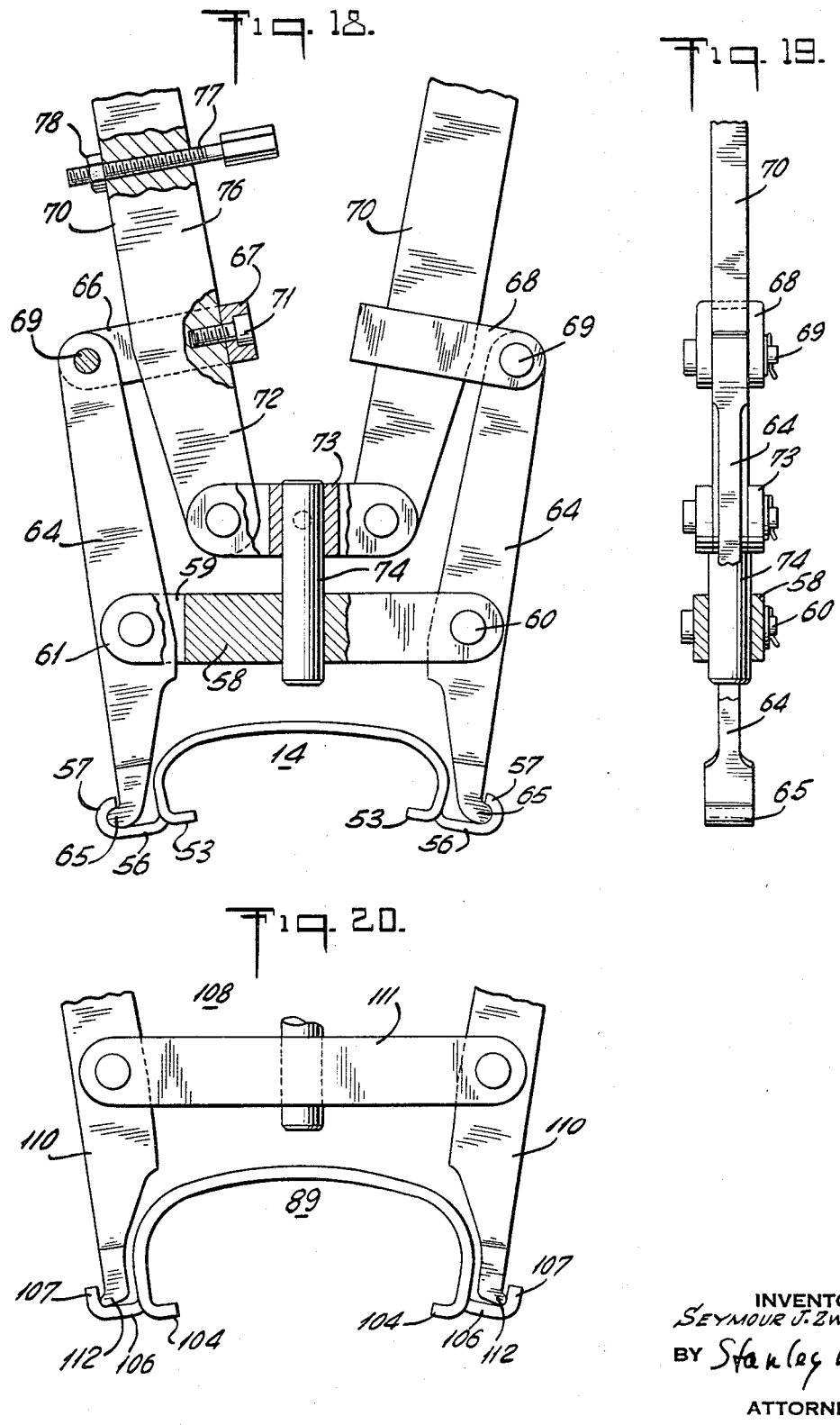

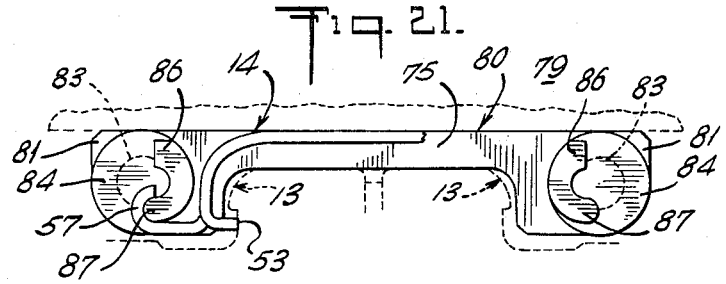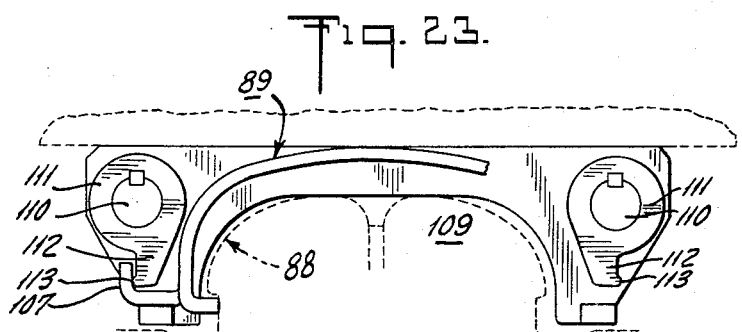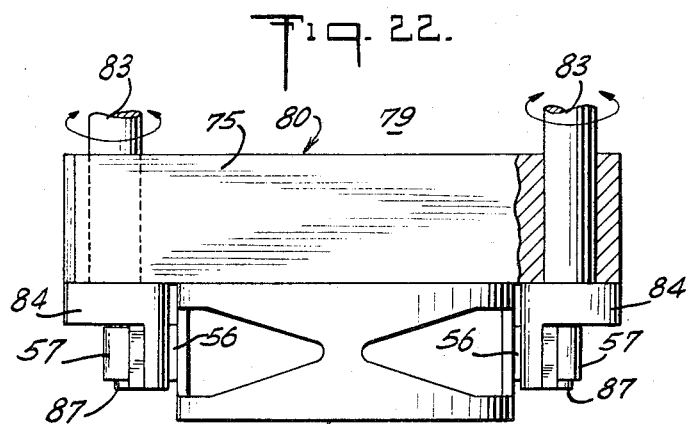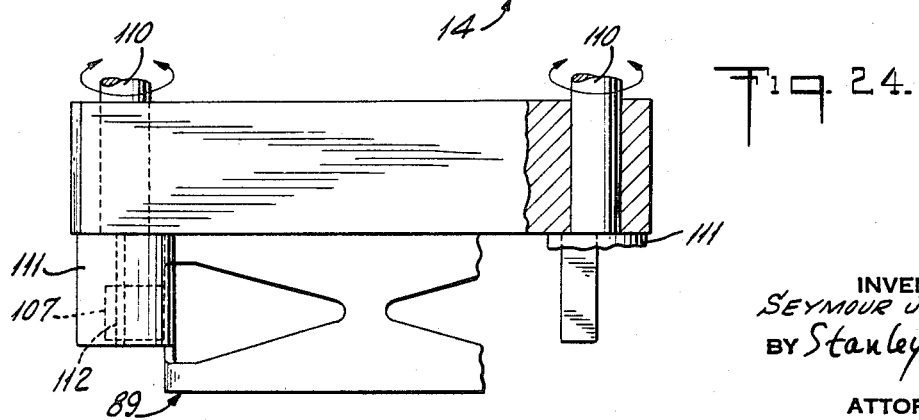

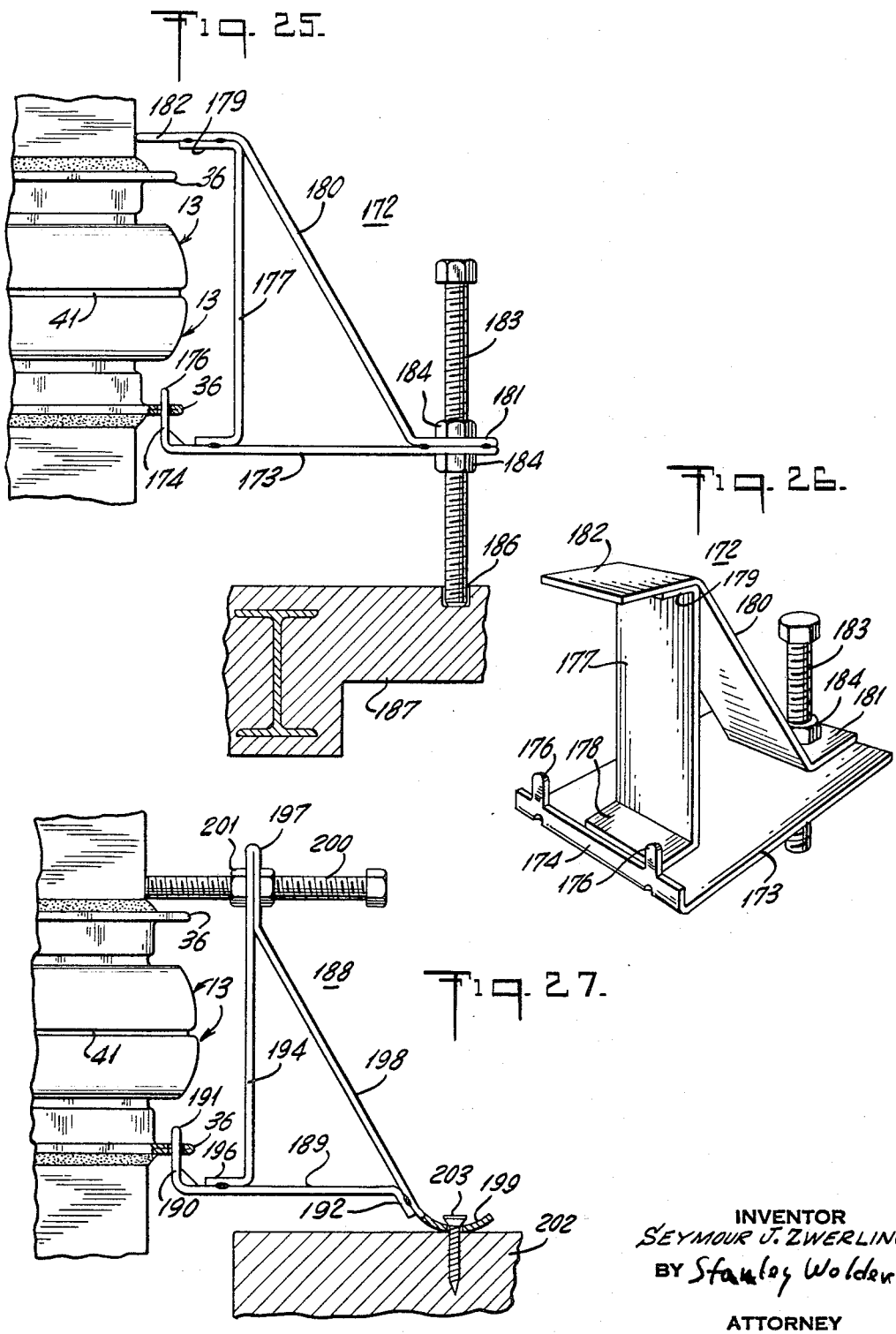

3,387,809
ENCLOSURE SYSTEM AND COMPONENTS
THEREOF
Seymour J. Zwerling, 1142 Lefferts Road,
Hewlett Bay Park, N.Y. 11557
Filed Oct. 24, 1965, Ser. No. 504,496
21 Claims. (Cl. 248—58)

ABSTRACT OF THE DISCLOSURE

An air duct structure comprises end to end ducts each provided with peripheral end coupling flanges formed of sheet metal and including a longitudinal panel having at its front end a transverse panel which joins an inwardly rearwardly extending panel having recesses formed therein. Spring clips join adjacent flanges and include opposite resilient arms joined by a cross web the ends of the arms being provided with inwardly directed legs engaging the flange recesses and outwardly directed arms terminating in upwardly projecting legs for the reception of a double lever clip spreading tool. The flanges, or other duct flanges, are provided with apertures for engaging a hooked end of a linear hanger having an opposite hooked end for engaging an overhead support such as another conduit or a ceiling support member advantageously in the form of an open bottomed ceiling recessed shell having opposite openings and a tubular member extending between the openings.

---

The present invention relates generally to improvements in enclosure and conduit systems and it relates more particularly to an improved duct work structure, assembly and mounting system and components thereof.

In the air conditioning, heating, ventilation and exhaustion of buildings, particularly large and multistory commercial and industrial installations, from a centrally located air heating and air cooling and conditioning plant, it is the general practice to circulate the temperature controlled conditioned air from the central heating, cooling and conditioning plant through a network of ducts to the various areas throughout the installation and recycled to the central plant. It is necessary that ducts be fabricated and installed to minimize friction and turbulence losses and air circulating power requirements. The construction and installation of suitable air circulating ductwork has heretofore presented many problems and the structures and practices employed possessed many drawbacks and disadvantages. Although the ducts or conduits may be prefabricated to specific lengths compatible with the ability to transport them to the field site without damage, they must be assembled on site and frequently require extensive site modification and adjustment, a time consuming and expensive practice with the conventional structures. Furthermore in the assembly of the units to form the finished ductwork and their mounting and support, particularly in cases where work changes are made during or after initial installation, many problems have been encountered which further contribute to high cost and inconvenience of the conventional practices.

Similar problems are encountered not only in liquid transport systems, but both liquid and air transport systems for particulate matter. Flour conveyance in air conduits and various slurries employed in chemical manufacture illustrate the latter. In such systems the need exists to readily disassemble portions of the system for cleaning and sanitation purposes.

It is therefore a principal object of the present invention to provide an improved enclosure system.

Another object of the present invention is to provide an improved conduit system.

Still another object of the present invention is to provide an improved ductwork system and support arrangement.

A further object of the present invention is to provide an improved duct coupling mechanism.

Still a further object of the present invention is to provide an improved device for anchoring a hanger link in a reinforced concrete ceiling.

Another object of the present invention is to provide an improved hanger mechanism for supporting ducts from overhead coupling elements.

Still another object of the present invention is to provide an improved bracket for mounting vertically extending ducts.

A further object of the present invention is to provide an improved clip device for clamping coupling flanges attached to continuous sequentially connected enclosure elements.

Still a further object of the present invention is to provide a ductwork and support system of the above nature characterized by its versatility, adaptability, convenience and ease of transport, assembly and installation, its ruggedness, superior rigidity per pound of material used and general superiority of construction and operation.

The above and other objects of the present invention will become apparent from a reading of the following description taken in conjunction with the accompanying drawings, wherein:

FIGURE 1 is a fragmentary front elevational view of a horizontal duct assembly supported from an overhead ceiling in accordance with the present invention;

FIGURE 2 is an enlarged sectional view taken along line 2—2 in FIGURE 1;

FIGURE 3 is a sectional view taken along line 3—3 in FIGURE 2;

FIGURE 4 is a vertical sectional view of a modified ceiling coupling which may be employed in the present structure;

FIGURE 5 is an enlarged sectional view taken along line 5—5 in FIGURE 1;

FIGURE 6 is an enlarged perspective view of the end coupling section of a hanger rod employed in supporting the horizontal ductwork;

FIGURE 7 is an enlarged sectional view taken along line 7—7 in FIGURE 1;

FIGURE 8 is a top plan view of a hanger support ceiling insert assembly;

FIGURE 9 is a bottom view thereof;

FIGURE 10 is a front elevational view thereof;

FIGURE 11 is an end elevational view thereof;

FIGURE 12 is an enlarged sectional view taken along line 12—12 in FIGURE 8, the device being illustrated embedded in a reinforced concrete ceiling with the coupling link shown by full line in a housed position and by broken line in an extended, suspended position;

FIGURE 13 is a sectional view taken along line 13—13 in FIGURE 12 with the coupling link illustrated in an extended position;

FIGURE 14 is an enlarged sectional view taken along line 14—14 in FIGURE 1;

FIGURE 15 is a perspective view of a coupling clamp embodying the present invention and employed in the assembly illustrated in FIGURE 14;

FIGURE 16 is a view similar to FIGURE 14 illustrating a modified form of duct coupling arrangement;

FIGURE 17 is a view similar to FIGURE 15 of a modified form of coupling clamp;

FIGURE 18 is a fragmentary front elevational view of a tool which may be employed to advantage for applying the clamp illustrated in FIGURE 15;

FIGURE 19 is a side elevational view thereof;

FIGURE 20 is a fragmentary view similar to FIGURE 18 of a modified tool which is employed with the coupling clamp of FIGURE 17;

FIGURE 21 is a front elevational view of another form of tool for applying the coupling clamp shown in FIGURE 15 in cramped or restricted areas;

FIGURE 22 is a fragmentary top plan view thereof;

FIGURE 23 is a view similar to FIGURE 21 of a modified tool for use with the coupling clamp shown in FIGURE 17;

FIGURE 24 is a fragmentary top plan view thereof;

FIGURE 25 is a front elevational view of a duct mounting bracket embodying the present invention illustrated supporting a vertical duct;

FIGURE 26 is a perspective view thereof; and

FIGURE 27 is a view similar to FIGURE 25 of a modified mounting bracket.

The enclosure and supported enclosure system embodying the present invention is characterized by many features which are employed to great advantage and contribute to a highly superior structure. Among these features is the arrangement for connecting and coupling adjacent ducts, for example conduits of rectangular transverse cross section in end to end arrangement, which includes a coupling frame mounted on the adjacent ends of successive conduit or duct units, the coupling frame being defined by rectangularly related legs, each of the legs comprising a longitudinally extending first panel in underlying abutment with a corresponding inner border of a respective conduit and projecting forwardly of said border and provided along its forward edge with an outwardly directed second panel confronting the corresponding second panel of the other coupling frame, a third panel extending rearwardly and inwardly from the upper part of said second panel to said first panel between the ends thereof and secured thereto, a fourth panel superimposed on the outer border of said respective conduit and secured along its forward edge to said first panel, and a plurality of spring clamps having resiliently inwardly urged legs engaging opposite rear faces of corresponding third panels of said frame members. An outwardly directed flange is integrally formed along the rear edge of the fourth panel and has coupling openings spaced along the length thereof. In order to suspend the assembled conduits horizontally from a reinforced concrete ceiling there are provided anchored support insert members which are imbedded in the undersurface of the concrete ceiling.

Each of the support insert members comprises a top wall, a separable bottom wall and opposite side walls and opposite end walls extending between said top and bottom walls, said side walls having aligned openings formed therein, an open-ended tubular member engaged by and extending between said aligned openings, and a coupling link engaging said tubular member and movable between a horizontally extending position within said shell and a vertically extending position depending from said tubular member below said shell upon removal of said separable wall. A rod projects through the tubular member and is imbedded in the concrete, the coupling link being supported by the rod by way of the wall of the tubular member. A plurality of hanger assemblies suspends the assembled ductwork from corresponding coupling links and each hanger assembly includes a pair of longitudinally extending substantially end to end laterally offset rods the adjacent ends of which project through longitudinal bores formed in a coupling member and are hooked over the corresponding edges of the bores. The outer ends of the rods are provided with coupling sections engaging vertically aligned pairs of a coupling link and an aperture in a coupling frame flange. The rod outer coupling section includes a rearwardly transversely inclined leg laterally offset relative to the corresponding rod in a first direction and joining an arm projecting therefrom in a direction opposite to said first direction, the arm terminating in a forwardly directed leg. In order to support vertically extending conduits there are provided support brackets, each of which comprises a support member which underlies and engages a coupling frame flange and is provided with one or more upwardly directed tongues which engage corresponding coupling frame flange openings, and a leg mounted above the support member and projecting into engagement with the conduit above the coupling frame.

Referring now to the drawings which illustrate a preferred embodiment of the present invention as applied to an air distributing ductwork in an air conditioning or hot air heating system in which the individual duct sections are of rectangular transverse cross-section, and particularly FIGURES 1 to 7 and 14 and 15 thereof, the reference numerals 10 and 11 generally designate a pair of end to end aligned rectangular conduits or ducts. The ducts 10 and 11 are formed of sheet metal or other material in a well known manner and are connected in air tight relationship by a coupling assembly 12. The coupling assembly comprises a pair of similarly shaped coupling frame units 13 arranged and mounted in a complementing relationship on the adjacent ends of the ducts 10 and 11, a plurality of coupling spring clips or clamps 14, and with or without a sealing gasket 16.

Each of the coupling frame units 13 is defined by four rectangularly arranged legs 18 which are suitably joined at their adjacent ends and is of a shape similar to that of the transverse cross section of the ducts 10 and 11. The frame units 13 are advantageously formed of sheet metal and each leg 18 includes an inner rectangular first panel 19 joining at its forward end, an integrally formed outwardly directed rectangular second panel 20 which is perpendicular to the first panel 19. A third panel 21 extends from the upper edge of the second panel 20 to a transversely extending line located between the front and rear edges of the first panel 19 and includes an outer section 22 projecting rearwardly from the upper edge of the second panel 20 and parallel to the first panel 19. The panel section 22 joins a curved corner section 23 which terminates in a forwardly directed shoulder section 24 provided at its forward end with an inwardly directed panel section 26 which is curved rearwardly at its inner edge, as at 27 to a rearwardly directed plate 28 superimposed on the outer face of the first panel 19 and suitably secured thereto such as by welds 29.

Directed outwardly from the trailing edge of the plate 28 is a low shoulder section 30 which is joined along its outer edge by a rearwardly projecting fourth panel 32 spaced from and parallel to the trailing section of the first panel 19 and extending to a point short of the rear edge thereof. The trailing edge of the fourth panel 32 is outwardly curved, as at 33, to join the front panel 34 of an outwardly directed coupling flange 36 which includes a rear panel 35 integrally joined to the front panel 34 along its upper edge and abutting the front panel 34 and extending inwardly to a point slightly outwardly of the level of the fourth panel 32. A plurality of elongated coupling slots 37 are formed along the length of the coupling flange 36. The shoulder section 24 and the panel section 26 define coupling clamp lug receiving sockets or recesses 38 and the fourth panel 32 and the trailing section of the first panel 19 define a slip joint socket 39.

In the assembled condition of a coupling frame 13 and a conduit 11 or 12, the end borders of the conduit are telescoped into the corresponding slip joint sockets 39 with the first panels 19 substantially abutting the inside faces of the conduit walls and the fourth panels substantially abutting or closely spaced to the outside faces thereof. An air tight seal may be effected between the coupling frame 13 and the corresponding duct by the application of any suitable sealing or caulking compound 25 along zones delineated by the trailing edges of the first panels 19 and the adjacent area of the duct border inside face and by the inner edge of the flange rear panel 35 and the adjacent area of the outside face of the corresponding duct border. If desired, the coupling frames may be further secured to the corresponding ducts by means of a plurality of metal screws 40 engaging corresponding registering openings in the first and fourth panels 19 and 32 and the respective borders of the ducts 10 and 11.

The ducts 10 and 11 may be coupled in an air tight condition by positioning the conduits 10 and 11 with the coupling frame front panels 20 in substantially coinciding confronting relationship, a rectangular gasket 41 of any suitable material being tightly sandwiched between the confronting faces of the front panels 20. The frames 13 are secured in their coupled position by a plurality of spring clamps 14 positioned around the coupling frames 13 and resiliently engaging the rear panel sections 26.

As best seen in FIGURES 14 and 15 of the drawings each spring clamp 14 is integrally formed of a strip of spring metal and includes an upper cross web 42 which is slightly upwardly convex when in its relaxed position. Depending from the ends of the cross web 42 and joined thereto by curved corners 43 are depending end arms 44. Symmetrical triangular openings 46 are formed in the cross web 42 and extend to and along the arms 44, the apices 47 of the openings 46 being longitudinally spaced on opposite sides of the medial longitudinal axis of the cross web 42 and being separated by a medially located web section 48. The bases 49 of the triangular openings 46 are disposed above the bottom edges of the arms 44 to delineate therewith cross bars 50. The sides of the openings 46 and the sides of the web 42 delineate pairs of transversely spaced outwardly converging arms extending from the web section 48 to the ends of the cross bars 50.

Depending from opposite ends of each of the cross bars 50 is a short leg 52 which terminates in an inwardly directed lug or ear 53 of greater depth than the frame coupling recess 38. Also depending from each of the cross bars 50 between the respective legs 52 is a short leg 54 provided at its lower edge with an integrally formed outwardly directed arm 56 which terminates at its outer end in an upwardy directed inwardly facing hook section 57. The hook sections 57 are for the reception of tool elements for effecting the opening of the spring clamp 14 attendant to its application to a pair of coupling frames 13.

A tool 55 which may be employed to great advantage in applying the spring clamps 14 where there is adequate space available is illustrated in FIGURES 18 and 19 and includes a lower cross bar 58 provided with a medially located vertical bore and terminating at opposite ends in outwardly directed yokes 59. Registering with each of the yokes 59 and rockably secured thereto by a respective pivot pin 60 is a vertically extending lever 61 including a relatively short lower arm 63 projecting below the yoke 59 and a relatively long upper arm 64. The lower ends of the arms 63 are transversely enlarged and terminate in outwardly directed rounded ribs 65 which are adapted to releasably engage the clamp hooks 57.

A U-shaped connector 66 includes an inner cross arm 67 and a pair of parallel legs 68 the ends of which embrace the upper end of each of the upper lever arms 64 and is swingably secured thereto by a pivot pin 69. An actuating lever 70 extends between the legs 68 of each of the connectors 66 and is secured to the respective cross arm 67 by a screw 71. Each actuating lever 70 includes a relatively short lower arm 72 the end of which is pivotly connected to the corresponding end of an upper cross bar 73 which is provided with a depending rod 74 which slidably engages the vertical bore formed in the lower cross bar 58. The levers 70 include upper elongated handle defining arms 76 one of which is provided with a tapped transverse bore which is engaged by an inwardly projecting adjusting screw 77 provided with a lock nut 78. The movement of the handles 76 toward each other and hence the spread of the hook engaging ribs 65 are adjustably limited by a corresponding adjustment of the screw 77.

In employing the tool 55 in applying a spring clamp 14 to a pair of coupling frames 13, the handle members 76 are spread to contract the lever arms 63 and ribs 65 and a spring clamp 14 is inserted into engagement with the tool 55 by bringing the ribs 65 into mating engagement with the opposite hook sections 57. The handles 76 are then squeezed together to separate the arms 63 and ribs 65 thereby resiliently spreading the lugs 63 a distance greater than that between the rear faces of the third panels 21 of adjacent coupling frames 13. The tool 55 is manipulated to bring the spring clamp into registry with a pair of coupling frames at the desired position, with the lugs 53 in alignment with corresponding recesses 38, and the handle members 76 are thereafter released and separated to relieve the pull on the hook elements 57 by the contraction of the ribs 65. The lugs 53 are thus resiliently urged by the spring clamp 14 into tight engagement with the frame sections 26 to lock the coupling frames 13 into a tightly assembled interconnected condition. The tool 55 is then separated from the applied spring clamp 14 and the other spring clamps 14 are applied in the above manner.

Under conditions where there is insufficient space for the use of the tool 55, such as when the duct assembly is positioned close to a wall, the tool 79 illustrated in FIGURES 21 and 22 of the drawings may be employed to great advantage. The tool 79 comprises a body member 80 including a horizontal cross bar 75 provided at opposite ends with a pair of parallel longitudinal sleeve bearing members 81 which project below the level of the cross bar 75 and delineate a longitudinal groove 82 of greater width than the spacing between the rear faces of the panels 21 of the assembled coupling frames 13 and of a height greater than the vertical distance between the frame panel section 22 and the coupling recesses 38. Journalled in and projecting through the bearing sleeves 81 are a pair of shafts 83. A pair of collars 84 are affixed to the leading ends of and rotate with the shafts 83 and abut the front faces of the bearing sleeves 81, the thickness of the collar 84 being about equal to the distance between an edge of the clamp arm 56 and the adjacent longitudinal edge of the clamp web 42. Positioned on the front face of each of the collars 84 is a forwardly projecting integrally formed rib 86 of substantially arcuate configuration extending for slightly less than 180° and of a depth about equal to the width of the clamp arm 56, the ribs 86 being provided with rounded leading tips 87 adapted to engage the clamp hooks 57. The shafts 83 are connected to a handle or lever arrangement spaced rearwardly of the body member 80, the handle arrangement providing or being connected to the shafts through any suitable mechanical advantage affording mechanism whereby the shafts 81 may be simultaneously rotated in opposite directions. It should be noted that the shafts 83 and the mechanisms attached thereto extend for a distance from the body member 80 at least equal to the maximum width of the duct and should not exceed the cross-sectional dimensions of the body member 80 within such distance.

In employing the tool 79 the shafts 83 are turned to bring the rib tips 87 toward each other and a spring clamp 14 is applied to the tool 79 with the clamp hooks 57 engaging the rib tips 87 and the rear edge of the clamp web 42 in close proximity to the front face of the clamp body member 80 as illustrated in FIGURES 21 and 22. The shafts 83 are then rotated by way of the handles, the left shaft 83 clockwise and the right shaft 83 counterclockwise to spread the clamp hooks 57 and the clamp lugs 53 to their expanded positions. The expanded spring clamp 14 is advanced with the tool 79 along the coupled frames 13 straddling the frame panels 13 until the desired position is reached and the tool handles are released permitting the shafts 83 to be rotated by the spring clamp 14 to the retracted positions of the rib tips 87. The spread clamp 14 is thus released to its clamp position with the clamp lugs 53 bearing on the clamp panel sections 26 and the tool 79 is then retracted. It should be noted that the tool may be advantageously modified by providing releasable latch means for locking the shafts 83 and rib members 86 in their expanded position against the action of the engaged expanded spring clamp 14. A flexible sheathed cable may be employed for opening the latching means and releasing the spring clamp 14 and the same cable may be employed for advancing and manipulating the tool 79 and the spring clamp 14 to the desired position. In the latter modification the shafts 83 are relatively short, and long rigid handles are obviated.

In FIGURES 16 and 17 there are illustrated modified forms of the coupling frame and the spring clamp which are designated 88 and 89 respectively. The coupling frame 88 differs from the coupling frame 89 principally in the relative proportions of the various sections thereof and in the configuration of the third panel 90. Of the coupling frame 88 the first panel 91, second panel 92, fourth panel 94 and flange member 96 are similar to and related in the manner of the correspondingly identified panels and flange of the coupling frame 13. The third panel 90, however, is curved rearwardly and downwardly to a forwardly directed shoulder 97 which delineates a coupling recess 98 with a section 99 depending from the forward edge of the shoulder 97 and joins the panel 94 by a plate 100 superimposed on and secured to the first panel 91 as by welding. The associated ducts are slip joined to the coupling frames 88 and predetermined areas caulked or sealed in the manner earlier described. It should be noted that the fastening screws are not required where the air pressure in the ducts is relatively low but may be used if desired.

The spring clamp 89 is provided with a crowned cross web 101 and depending legs 102 somewhat larger than the clamp legs 44 to accommodate the deeper coupling frames 88, and except for the tool receiving elements is similar to the spring clamp 14. Projecting outwardly from the cross bars 103 along the bottoms of the legs 102 and between the inwardly directed lugs 104 are arms 106 which terminate in upwardly directed ears 107.

The tools for applying the spring clamps 89 are similar to the tools 55 and 79 modified to accommodate the ears 107 instead of the hook sections 57 and are illustrated in FIGURES 19, 23 and 24 and are designated 108 and 109 respectively. In the tool 108, the levers 110 which are pivotly connected to opposite ends of a lower cross bar 111 terminate at their bottoms in transversely enlarged heads provided with outwardly downwardly projecting transverse ribs 112 which are adapted to engage the bottom inner surfaces of the spring clamp ears 107. The tool 109 differs from the tool 79 only in the shape of the spring clamp engaging elements and is provided with a pair of bearing sleeves journalled, transversely spaced, parallel shafts 110 corresponding to the shafts 83. Keyed to the leading end of each of the shafts 110 is a sleeve 111 provided along the length thereof with a transversely projecting or depending integrally formed arm 112. An outwardly directed lip is formed at the bottom outer corner of each arm 112 and extends for length thereof, being adapted to engage the bottom inner face of a clamp ear 107. The tools 108 and 109 operate in the manner earlier described in the application of spring clamps 89.

Where the individual ducts 10 or 11 are of great length or for other reasons, it is desirable to reinforce these ducts and the structure illustrated in FIGURES 1 and 5 is employed to this end with great advantage. Specifically, a rectangular or peripheral reinforcing frame 114 is positioned on and surrounds a respective duct and is firmly secured thereto, the frame 114 being delineated by legs 116 extending along corresponding sides of the duct. Each of the legs 116 is preferably integrally formed of sheet metal and includes a pair of spaced parallel panels 117 provided along their bottom edges with outwardly directed flanges 118 which are superimposed on and suitably fastened to the corresponding duct wall. The upper edges of the panels 117 are joined by an integrally formed cylindrical wall 119 communicating through a bottom slot along its length with the space between the panels 117 to delineate therewith a reinforcing bar housing space with a cylindrical outer section 120 and a rectangular inner section 121.

The hollow legs 116 are each open at at least one end thereof to provide access to the housing spaces. Depending on the stresses imparted to the duct one or more reinforcing bars may be positioned in one or more of the housing spaces. Thus, as illustrated in the drawings, a rectangular reinforcing bar 122 is positioned in the housing sections 120 and 121 extending for the full height thereof and for the full width of the housing section 121. In the alternative, the bar 122 may be of reduced thickness, may be replaced by a cylindrical rod nesting in the housing section 120 or by a so nested cylindrical rod and a bar nested in the housing section 121. Longitudinally spaced aligned coupling slots are formed in the panels 117 and reinforcing bars 122 which correspond to the coupling slots 37 and permit suspension to and from the frames 114, by engagement of such slots with coupling frame flange 36.

In order to suspend the assembled ducts from an overhead reinforced concrete ceiling 123, there are advantageously provided insert support devices 126 which may be cast in place in the undersurfaces of the ceiling 123 and are best seen in FIGURES 1 to 3 and 8 to 13. The insert device 126 comprises a shell 127 formed preferably of sheet metal or other suitable material and includes a pair of interfitting channel members 128 and 129 respectively. The channel member 128 comprises an upper horizontal cross web 130 connected by curved corners to opposite parallel vertical leg panels 132 which depend from the side edges of the cross web 130 and have downwardly diverging end edges. The panels 132 terminate at their bottom edges in outwardly directed horizontal coplanar flanges 133 having apertures 134 formed therein. Relatively large openings 136 are formed in the panels 132 adjacent their end edges.

The second channel member 129 is of lesser length than the first channel member 128 and includes a bottom horizontal cross web 137 substantially coplanar with the flanges 133 and registering with the bottom opening of the first channel member 128 and medially positioned between the ends thereof. Projecting upwardly from the side edges of the bottom cross web 137 and integrally formed therewith are parallel vertical panels 140 which abut the inside faces of the panels 134 and extend to a point below the upper cross web 130. A pair of parallel opposite vertical end panels 141 are integrally formed with and project upwardly from the end edges of the bottom web 137, the side and bottom edges of the panels 141 engaging the inside faces of the vertical panels 132 and top web 130 inwardly of the openings 136. A medially located tongue 143 projects from the upper edge of each end panel 141 and engages a corresponding slot formed in the top web 130.

Spaced cuts defining a line of weakness 144 are formed in the usual manner in the bottom web 137 and delineate a knock out plate 146 extending for a major part of the web 137. A pair of longitudinally spaced slots 147 are formed in the wings of the knock out plate 146 for the reception of a tool such as a screw driver to facilitate the separation of the knock out plate. Transversely aligned openings are formed in the vertical panels 134 and 140 and a tubular member 148 registers with said openings and extends across the shell 127. The ends of the tubular member are upset to form peripheral flanges 149 which tightly engage the outer faces of the vertical panels 134. A link 150 in the form of an elongated metal loop is housed in the shell 127 and encircles the tubular member 148, extending horizontally lengthwise of the shell 127 and resting on the bottom web 137.

In applying the support devices 126 they are positioned at the desired locations on the bottom ceiling form 151 and secured thereto by large head nails 152 registering with the flange openings 134. The slab reinforcing rods are also positioned on the form 151 in the usual manner and an anchoring rod 154 is inserted through each of the tubular members 148 and overlies the reinforcing rods 153. The rod 154 is of a diameter, size and shape to firmly anchor in the ceiling and to easily support the weight of the load applied thereto, that is the proportional part of the hung duct assembly. The concrete is then poured onto the forms 151 to embed the support devices 126 and rods 153 and 154, none of the concrete entering the shells 127 or extending along the underfaces thereof. The openings 136 through which the concrete extends reinforce the anchoring of the shells 127. Upon the adequate setting of the concrete the forms 151 are removed in the usual manner and the exposed parts of the nails 152 are clipped. The knock out plates 146 are then detached and the links 150 drop to their suspended positions as illustrated in FIGURES 1 and 13 and by broken line in FIGURE 12, the links 150 transmitting any load connected thereto to the rods 154 by way of the walls of the tubular members 148.

An alternative arrangement which may be employed for attaching a hanger assembly to a concrete ceiling is illustrated in FIGURE 4 and includes a frusto-conical body member 153 preferably formed of metal and having a tapped axial bore 154 formed therein. The body member 153 is cast in place in the manner of the support device 127 with the flat small end thereof initially resting in the floor form and the bore 154 suitably closed at its upper end to the concrete, or such member may be driven in and set mechanically after concrete is set. An eye bolt 156 engages the tapped bore 154 and supports a ring or link member 157.

Self-evidently, the hanger assembly may be suspended from an eye bolt or other device attached to steel, wood or other material forming part of a ceiling, wall or like structure.

In order to suspend the duct assembly from the ceiling mounted links 150 or 157 or similar members there is provided a plurality of hanger units 158 which connect coupling apertures 37 in the coupling frame flanges 13 with corresponding ceiling links 150. Each of the hanger units 158 comprises a pair of elongated upper and lower hanger members 159 and 160 respectively having their adjacent lower and upper ends joined by a coupling member 161. The hanger members 159 and 160 are of similar configuration being formed of metal rods 163 which in their assembled condition are hook shaped, as at 164, at their adjacent inner ends. The outer end of each rod 163 is formed into a self locking coupling section 165 which includes a longitudinal leg 166 extending coaxially outwardly from the rod 163 and joined by a curved laterally extending crotch section 167 to a short inwardly directed leg 168 parallel to and laterally offset from the leg 166. Projecting from the upper end of the leg 168 is an inwardly rearwardly inclined leg 169 which joins at its upper end at the level of the top of the leg 166 a horizontal arm 170 which extends laterally from the top of the leg 169 to the other side and behind the leg 166 and terminates in a horizontal leg 171 projecting forwardly of and spaced from the leg 166. It should be noted that in the unassembled condition of the hanger unit 158, one or both of the rods 163 are unbent at their inner ends. The leg 171 functions as a stop or abutment to limit the horizontal displacement of the leg 166 attendant to any tendency of the rod 163 to move transversely or horizontally.

The coupling member 161 includes a body member having a pair of adjacent longitudinal bores formed therein adapted to slidably engage the corresponding rods 163 and is advantageously formed of heavy sheet metal.

In suspending the duct assembly from the ceiling 123 by means of the hanger units 158, the coupling section 165 of the upper hanger member 159 is threaded into engagement with a link 150 by inserting the coupling leg 171 into the link 150, turning the coupling section to bring the crotch 167 into alignment with the bottom of the link 150 and dropping the rod to bring the crotch 167 to rest on the corresponding bottom inner face of the link 150 (as seen in FIGURES 1 and 2). The upper rod is then inserted into one of the bores of the coupling member 161 and its end bent upwardly as at 164 to engage the bottom edge of the coupling member 161, any suitable tool being employed such as a pipe or socket member adapted to engage the end of the rod 163 and provide a bending lever. It should be noted that the coupling member 161 may be applied to the upper hanger member 159 before it is attached to the link 150.

A mating lower hanger unit 160 is attached to a corresponding point on the coupling frame flange 36 by connecting the respective hanger coupling section 165 through a flange aperture 37 in the manner described above. The duct assembly is temporarily supported in position in any suitable manner such as by scaffolding or the like and the upper end lower rod 163 is brought adjacent the lower end of the upper rod 163, the coupling member raised and then lowered to bring the other bore therein into engagement with the lower rod 163. The hanger members 159 and 160 are then drawn together and with the coupling member 161 in its lowermost position the section of lower rod 163 projecting above the coupling member 161 is bent over in the manner previously described to form the locking leg of hook 164 and complete the assembly of the hanger unit 158. If desired the coupling member 161 may be crimped to lock the hanger members 159 and 160 against any relative axial movement. A plurality of hanger units 158 are employed for supporting a duct assembly from corresponding overhead links and these are advantageously employed in pairs engaging opposite sides of corresponding coupling frame flanges 36. By reason of the structures shown and described, two shortcomings of the prior art are obviated. First, it is not necessary to cut to precise tolerances the vertical members extending between the ceiling and the duct. Second, it is not necessary to precisely locate the point of attachment of the vertical supporting member to the ceiling. It should be noted that other procedures of assembling and hanging the ducts may be employed in accordance with the associated structural conditions. The duct systems and the individual ducts may be suspended by the intermediate frames 114 by way of the coupling slots formed therein in cooperation with hanger units 158 as well as by the flange slots 37. Moreover, the ducts, as well as being suspended from the ceiling as described, may be suspended from other ducts and extend either parallel or at an angle thereto and may be coupled to the overlying ducts by hanger units 158 joining coupling flanges 36 or intermediate frames 117 of the lower duct to those of the upper duct.

The duct assembly employing the coupling frames described above is also adapted for vertical support and to this end the mounting brackets illustrated in FIGURES 25 to 27 of the drawings are employed to great advantage. The mounting bracket 172 shown in FIGURES 25 and 26 includes a rectangular horizontal base plate 173 provided along its leading edge with an upstanding flange 174. Directed upwardly from the flange 174 is a pair of vertical tongue elements 176 of smaller cross sectional area than the support frame flange openings 37 and spaced longitudinally apart a distance equal to the spacing between successive openings 37.

Positioned on the base plate 173 rearwardly of the flange 174 is an upwardly projecting vertical plate 177 having a bottom flange 178 superimposed upon and secured to the base plate 173 and a forwardly directed top flange 179. Extending rearwardly and downwardly from the top edge of the plate 177 is a panel 180 terminating in a rearwardly directed flange 181 superimposed on and secured to the base plate 173 by welding or the like. An arm 182 projects forwardly of the upper edge of the panel 180 and overlies and is secured to and projects beyond the flange 179 to a point forward of the base flange 174 a predetermined distance in accordance with the dimensions and configuration of the coupling frame 13. A hex headed vertical mounting bolt 183 passes downwardly through aligned openings formed in the flange 181 and base plate 173 and is engaged by a pair of lock nuts 184 which embrace the flange 181 and base plate 173 and permit the vertical adjustment and locking of the bolt 183.

In employing the mounting bracket 172 to support a vertically extending duct assembly the bracket tongues 176 are brought into registry with a corresponding pair of openings 37 in the frame flange 36 of a lower coupling frame 13, the bracket flange 174 engaging the underface of the frame flange 36. The bracket upper flange 182 engages the confronting wall of the upper duct of the coupled duct assembly and the lower end of the bolt 183 nests in a shallow positioning well 186 formed in a floor 187 or other support. The nuts 184 are adjusted to bring the bracket 172 to the desired level and are then tightened.

A modified form of mounting bracket 188 is illustrated in FIGURE 27 of the drawing and includes a horizontal base plate 189 provided at its leading edge with an upstanding flange 190 provided with upright tongues 191 corresponding to the flange 174 and the tongues 176 and at its trailing edge with a rearwardly downwardly inclined flange 192. A vertical plate 194 projects upwardly from the base plate 189 rearwardly of the flange 190 and is provided at its bottom edge with a flange 196 superimposed on and secured to the base plate 189. A short panel 197 is integrally formed with the plate 194 and extends from the upper edge of the plate 194 along the rear face thereof and joins a rear panel 198 which extends downwardly and rearwardly to the flange 192 to the rear face of which it is secured. The rear panel 198 terminates in a downwardly convex, curved, apertured foot piece 199 disposed below and rearwardly of the base plate 189. A hex head horizontal bolt 200 registers with aligned openings formed in the panel 197 and the upper border of the plate 194 and is engaged by a pair of lock nuts 201 which embrace the panel 197 and the plate 194.

The mounting bracket 188 is employed in a manner similar to the mounting bracket 172, the bracket 188 being secured to a horizontal support 202 by means of a nail 203 engaging the foot piece 199. The tongues 191 are positioned in registry with corresponding openings 37 in the lower coupling frame flange 36 with the bracket flange 190 engaging the underface of the flange 36 and the bolt 200 is axially adjusted to bear on the upper duct of the vertically coupled ducts and then locked by tightening the nuts 201. It should be noted that a vertical positioning bolt similar to the bolt 183 and associated lock nuts may be substituted for the nail 203 to provide vertical adjustment for the bracket 188.

It should be noted that a vertically extending conduit may be suspended from a side support by the employment of one or more hanger members of the type described above instead of the above described support brackets. For example, in supporting a conduit of the above structure from a side wall, a suitable coupling member, for example, an eye or link, is secured to the side wall in any suitable manner. A hanger member has one coupling end thereof engaging the coupling member and the other coupling end thereof engaging a coupling aperture in a frame leg on the conduit which frame leg is disposed below the coupling member so that the hanger member is downwardly inclined from the coupling member to the coupling aperture. The hanger member may be applied and adjusted as described above.

In addition, a lower conduit may be supported from an upper conduit which in turn is supported by hangers from an overhead support as described above. The lower conduit may be parallel or at an angle to the upper conduit and is suspended therefrom by hangers of the above type which engage corresponding coupling apertures in the frames on the upper and lower conduits. Furthermore, coupling apertures may be formed in the legs of reinforcing frames which are located between the ends of the conduit sections and the hangers or brackets may engage these apertures either for the support of the respective conduit section or for supporting an underlying conduit therefrom.

While there have been described and illustrated preferred embodiments of the present invention, particularly in the field of heating and air conditioning system ducts, it is apparent that numerous alterations, omissions and additions may be made without departing from the spirit thereof. Obviously the present invention may be applied to enclosures generally and conduits generally as well. While rectangular enclosures and ducts have been employed, the present invention is applicable to such devices of other than rectangular cross section.

What is claimed is:

1. A spring clip comprising a resilient strip including a longitudinally extending cross piece provided at opposite end thereof with depending legs, a pair of transversely spaced lugs projecting inwardly from the lower end section of each of said legs, and an arm projecting longitudinally outwardly from each of said leg lower end sections transversely between the lugs of a respective pair thereof and terminating in upwardly projecting ears.

2. A spring clip comprising a resilient strip including a longitudinally extending cross piece provided at opposite ends thereof with depending legs, a lug projecting longitudinally inwardly from the lower end section of each of said legs and terminating in a free biting edge, and an arm projecting outwardly from each of said leg lower end sections and terminating in an upwardly projecting ear.

3. The spring clamp of claim 1 wherein said strip has a pair of longitudinally extending longitudinally spaced triangular openings formed therein, the apices of said openings being symmetrically spaced on opposite sides of the medial transverse axis of said strip and the bases of said triangular openings extending transversely along said depending legs.

4. The spring clamp of claim 1 wherein said resilient strip has longitudinally extending openings formed therein longitudinally spaced on opposite sides of the medial transverse axis of said strip.

5. The spring clamp of claim 1 wherein said longitudinally extending section is curved.

6. The spring clamp of claim 1 wherein said ears are hook shaped and face inwardly toward each other.

7. An enclosure conduit coupling device comprising a transversely extending coupling flange member including an inner longitudinally extending first panel provided at its front end with an outwardly projecting second panel, and a third panel extending rearwardly and inwardly from the upper part of said second panel to said first panel and secured thereto, said third panel having a recess formed in its rear face for the reception of a clamping lug.

8. An enclosure coupling device comprising a transversely extending coupling flange member including an inner longitudinally extending first panel provided at its front end with an outwardly projecting second panel, a third panel extending rearwardly and inwardly from the upper part of said second panel to said first panel, forward of the rear edge thereof and secured thereto, and a fourth panel substantially parallel to and spaced above the trailing section of said first panel, rearwardly of said third panel and secured adjacent the leading edge thereof to said first panel to delineate therewith a slip joint coupling.

9. A conduit coupling device comprising a transversely extending coupling flange member including an inner longitudinally extending first panel provided at its front end with an outwardly projecting second panel, a third panel extending rearwardly and inwardly from the upper part of said second panel to said first panel forward of the rear edge thereof and secured thereto, a fourth panel substantially parallel to and spaced above the trailing section of said first panel rearwardly of said third panel and secured adjacent the leading edge thereof to said first panel to delineate therewith a slip joint coupling, and a flange section projecting outwardly from the trailing edge of said fourth panel and having coupling recesses formed therein.

10. The conduit coupling device of claim 9 wherein said flange section includes a fifth panel integrally formed with and projecting outwardly from the rear edge of said fourth panel and a sixth panel integrally formed and extending inwardly from the outer edge of said fifth panel and substantially abutting the rear face of said fifth panel.

11. The conduit coupling device of claim 9 wherein said third panel has rearwardly directed recesses formed therein.

12. The conduit coupling device of claim 9 wherein said third panel includes an outer rearwardly directed section terminating along its rear edge with an inwardly directed section.

13. A coupled conduit assembly comprising a pair of longitudinally extending first and second conduits of similar transverse, rectangular cross section arranged and in end to end relationship, rectangular first and second coupling frames mounted on the adjacent end borders of respective conduits, each of said coupling frames being delineated by rectangularly arranged legs each of which includes a longitudinally extending first panel in underlying abutment with a corresponding inner border of a respective conduit and projecting forwardly of said border and provided along its forward edge with an outwardly directed second panel of said second coupling frame, a third panel extending rearwardly and inwardly from the upper part of said second panel to said first panel between the ends thereof and secured thereto and a fourth panel superimposed on the outer border of said respective conduit and secured along its forward edge to said first panel, and a plurality of spring clamps engaging opposite rear faces of corresponding third panels of said first and second frame members.

14. The coupled conduit assembly of claim 13 wherein said third panels have recesses formed in the rear faces thereof and said spring clamp legs are provided adjacent their ends with inwardly directed lugs engaging said recesses.

15. The coupled conduit assembly of claim 13 including an outwardly directed flange integrally formed with and along the rear edge of each of said third panels and having openings formed therein.

16. The combination comprising a conduit section including a first outwardly directed flange positioned on said conduit section and having coupling apertures formed therein, and a hanger device comprising a substantially linear elongated member having coupling hooks located at opposite ends thereof, one of said coupling hooks engaging one of said apertures and the other of said coupling hooks being adapted to engage a support member disposed at a level above said flange.

17. The combination comprising a conduit section including a peripheral outwardly projecting frame located on said conduit section between the ends thereof and having coupling apertures formed therein, and a hanger device comprising a substantially linear elongated member having coupling hooks located at opposite ends thereof, one of said coupling hooks engaging one of said apertures and the other of said coupling hooks being adapted to engage a support member disposed at a level above said flange.

18. The combination comprising a conduit section including a peripheral outwardly projecting frame located on said conduit section adjacent to an end thereof and having coupling apertures formed therein, and a hanger device comprising a substantially linear elongated member having coupling hooks located at opposite ends thereof, one of said coupling hooks engaging one of said apertures and the other of said coupling hooks being adapted to engage a support member disposed at a level above said flange.

19. A conduit assembly suspended from an overhead support comprising a first conduit section disposed below said overhead support and including a peripheral outwardly projecting first frame located on said first conduit section and having first apertures formed therein, a first substantially linear hanger member having coupling hooks disposed at opposite ends thereof, one of said coupling hooks engaging said overhead support and the other of said coupling hooks engaging one of said first apertures, a second conduit section disposed below said first conduit section and including a peripheral outwardly projecting second frame located on said second conduit section and having second apertures formed therein, and a second substantially linear hanger member having opposite coupling hooks engaging one of said first and one of said second apertures respectively.

20. The conduit assembly of claim 19 wherein said first and second conduit sections are parallel.

21. The conduit assembly of claim 19 wherein said first and second conduit assemblies are at an angle to each other.

References Cited

UNITED STATES PATENTS

| | | | |
|---|---|---|---|
| 1,225,478 | 5/1917 | Murray | 285—412 |
| 1,255,219 | 2/1918 | Redersen | 248—60 |
| 1,796,529 | 3/1931 | McCall | 285—412 XR |
| 2,491,700 | 12/1949 | Zwerling | 285—406 XR |
| 2,627,430 | 2/1953 | Koffler | 285—406 |
| 3,091,487 | 5/1963 | Gallagher et al. | 285—406 XR |

ROY D. FRAZIER, *Primary Examiner.*

J. F. FOSS, *Assistant Examiner.*